Patented Jan. 9, 1923.

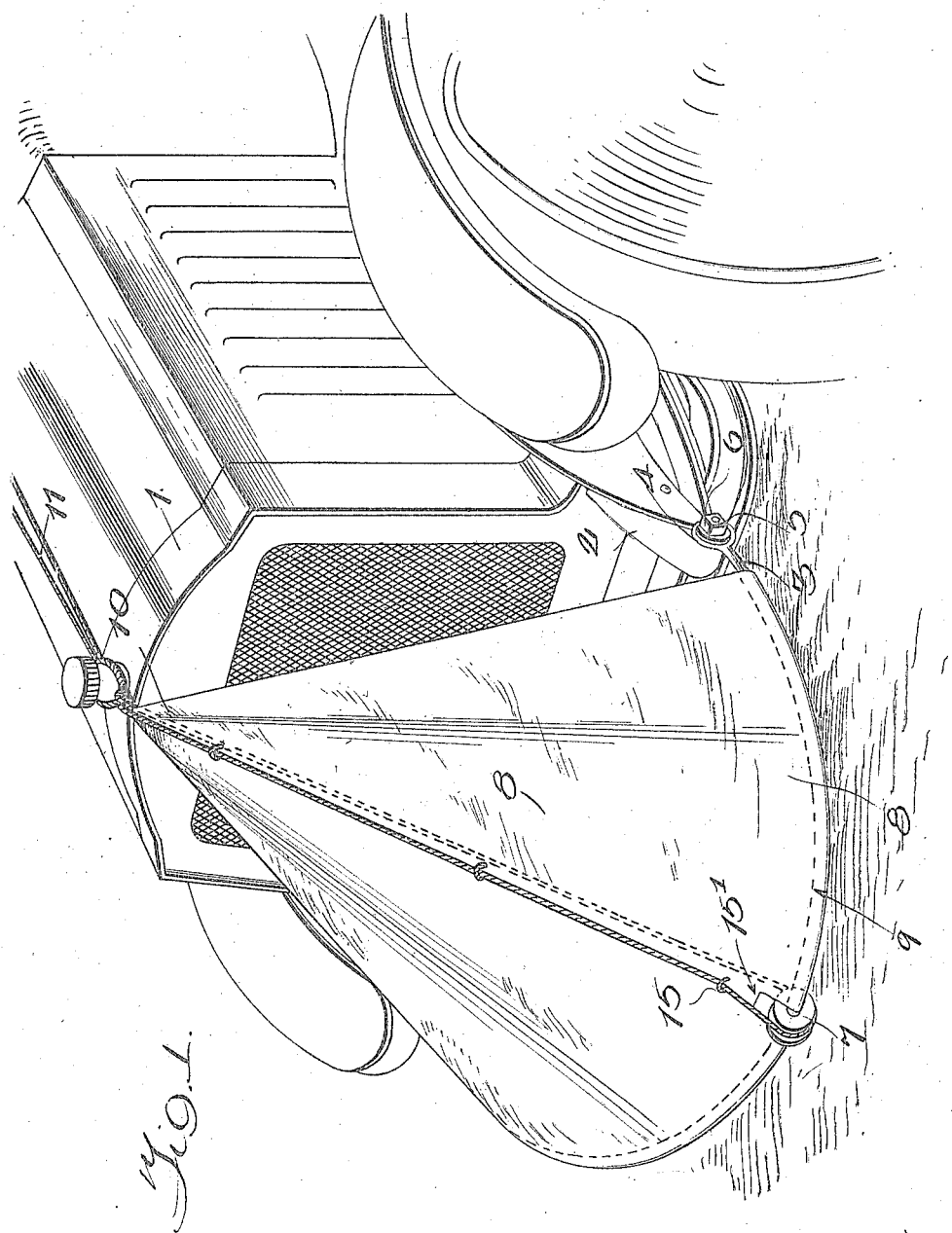

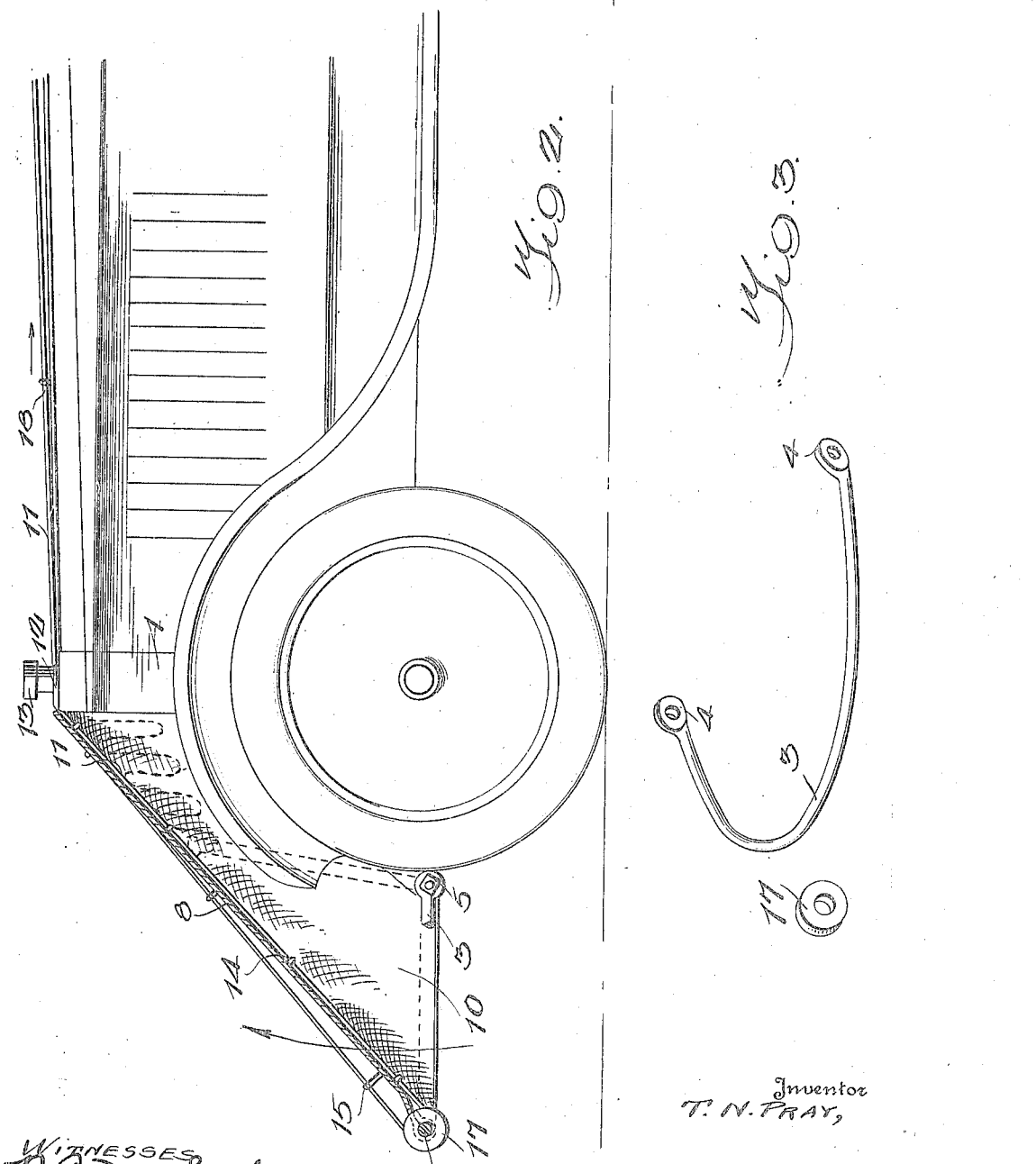

1,441,748

UNITED STATES PATENT OFFICE.

THOMAS N. PRAY, OF DENVER, COLORADO.

AUTOMOBILE FENDER.

Application filed July 6, 1922. Serial No. 573,222.

*To all whom it may concern:*

Be it known that I, THOMAS N. PRAY, a citizen of the United States, residing at Denver, in the county of Denver and State of Colorado, have invented certain new and useful Improvements in Automobile Fenders, of which the following is a specification.

This invention relates to an automobile fender and has for its object the production of a simple and efficient device which may be conveniently and efficiently attached to the forward end of an automobile or other motor vehicle, and which may be conveniently operated for lowering the same over the front end of an automobile to constitute a fender.

Another object of this invention is the production of a simple and efficient fender which may be attached to the front of an automobile in such a manner as to cause any object with which the same may be brought into contact, to be sheered over or thrown to one side of the vehicle, thereby preventing the automobile from running over or otherwise injuring a person or object with which it might come in contact.

With these and other objects in view this invention consists of certain novel constructions, combinations and arrangements of parts as will be hereinafter fully described and claimed.

In the drawings:—

Figure 1 is a perspective view of the forward end of an automobile showing the fender in a lowered position, or in what might be termed an operative position.

Figure 2 is a side elevation of the front end of an automobile, the fender being shown in vertical section and being shown in full lines in the lower position and in dotted lines in a raised position, and Figure 3 is a perspective view of the supporting yoke which is carried by the bottom of the fender.

By referring to the drawings it will be seen that 1 designates the radiator of an ordinary type of automobile which is supported upon the usual frame work and is provided with the usual supporting springs 2 at the forward end of the automobile. A semi-circular yoke of suitable weight and suitable material indicated by the numeral 3 is used in connection with the present device and is provided with suitable eyes 4 at the respective ends thereof, which eyes are adapted to fit over suitable bolts 5, nuts 6 being threaded upon the bolts 5 for the purpose of retaining the eyes 4 upon the bolts 5. These bolts 5 constitute journals for the yoke 3. A pulley 7 is journaled centrally upon the semi-circular yoke 3 as clearly shown in Figs. 1 and 2 of the drawings.

A canvas or other suitable flexible covering 8 is securely fastened along its lower edge as indicated at 9 to the yoke 3 and is substantially cone shaped in formation, tapering from the bottom toward the top or apex 10 thereof as illustrated clearly in Fig. 1 of the drawings. As will be obvious by considering the drawings, the yoke 3 is journaled upon each side of the frame of the car in such a manner as to permit the yoke to be swung upwardly to a vertical position in order to collapse the collapsible or flexible covering 8 when it is so desired. A flexible cord 11 is provided with a loop 12, which loop 12 is adapted to fit over the radiator cap 13 of the usual construction. The flexible cord or rope 11 is secured or retained in engagement with the collapsible covering 8 by means of suitable eyelets 14 which eyelets are secured to the under face of the collapsible covering 8 as clearly shown in Fig. 2 of the drawings. This flexible cord or rope 11 passes down along the pulley 7 as clearly shown in Figs. 1 and 2 and is then passed up over the front face of the flexible covering 8 and through the guiding eyes 15 as clearly shown in Fig. 1. This cord 11 then passes rearwardly over the hood of the automobile, back through the windshield and may be secured or fastened in any suitable or desired manner to a suitable hook or other support which may be provided in the rear of the windshield.

It should be understood that the yoke 3 is formed of suitable material to possess sufficient weight to cause the flexible or collapsible covering 8 to automatically drop to an operative or open position such as is shown in Fig. 1 as soon as the cord 11 is released. When it is desired, however, the fender may be drawn to a vertical or to a collapsed position such as is shown in dotted lines in Fig. 2 by pulling inwardly upon the cord 11 and fastening the same by means of a suitable eye 18 which may be provided at a suitable point upon the flexible rope or cord 11.

It should be further understood that the yoke 3 may be secured or fastened to the frame of the automobile at any suitable or desired point to suit the convenience of the operator or to suit the particular design of the machine upon which the device may be attached.

As clearly shown in Fig. 1 of the drawings, the collapsible covering 8 is provided with a notch 15' near the center thereof, to constitute a pocket for the pulley 7 and permit the pulley to efficiently operate without injury to the collapsible covering 8.

It should be further understood that certain detail changes in the mechanical construction may be employed in the present device without departing from the spirit of the invention, so long as these changes fall within the scope of the appended claim.

Having thus described the invention, what is claimed is:—

The combination with an automobile including a body and supporting springs therefor, of a fender for the forward end of the automobile including a semi-annular yoke having its ends terminating in eyes, pivot bolts carried by the springs extending through the eyes, a semi-conical shaped flexible cover secured at its lower end to the yoke and at the upper apex portion thereof to the body, guides carried by the inner and outer surface of the covering at the central portion thereof, a pulley carried by the yoke at a point equidistant its ends, and a lifting cable secured at one end to the body and threaded through the guiding means on the inner surface of the body, around said pulley and through the guiding means carried by the outer surface of the covering and rearwardly of the body.

In testimony whereof I affix my signature in presence of two witnesses.

THOMAS N. PRAY.

Witnesses:
KATHERYN M. PEEKMAN,
ROBERT I. CURRY.